March 12, 1957   I. R. RINKEWICH   2,784,460
SLIDABLE AND HINGED WINDOW SASHES
Filed May 12, 1955   3 Sheets-Sheet 1

INVENTOR.
ISAAC R. RINKEWICH
BY
L. S. Saulsbury
ATTORNEY

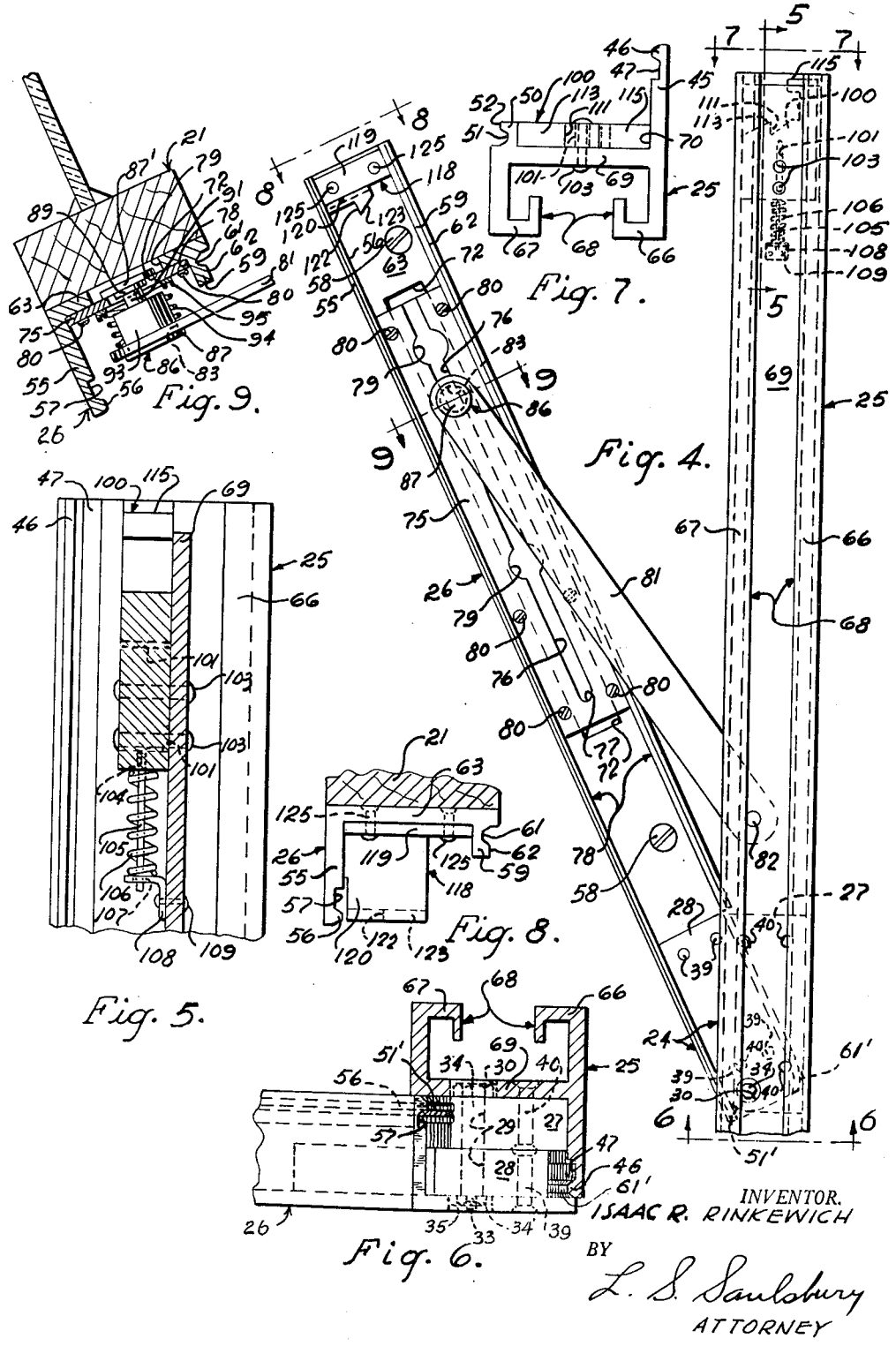

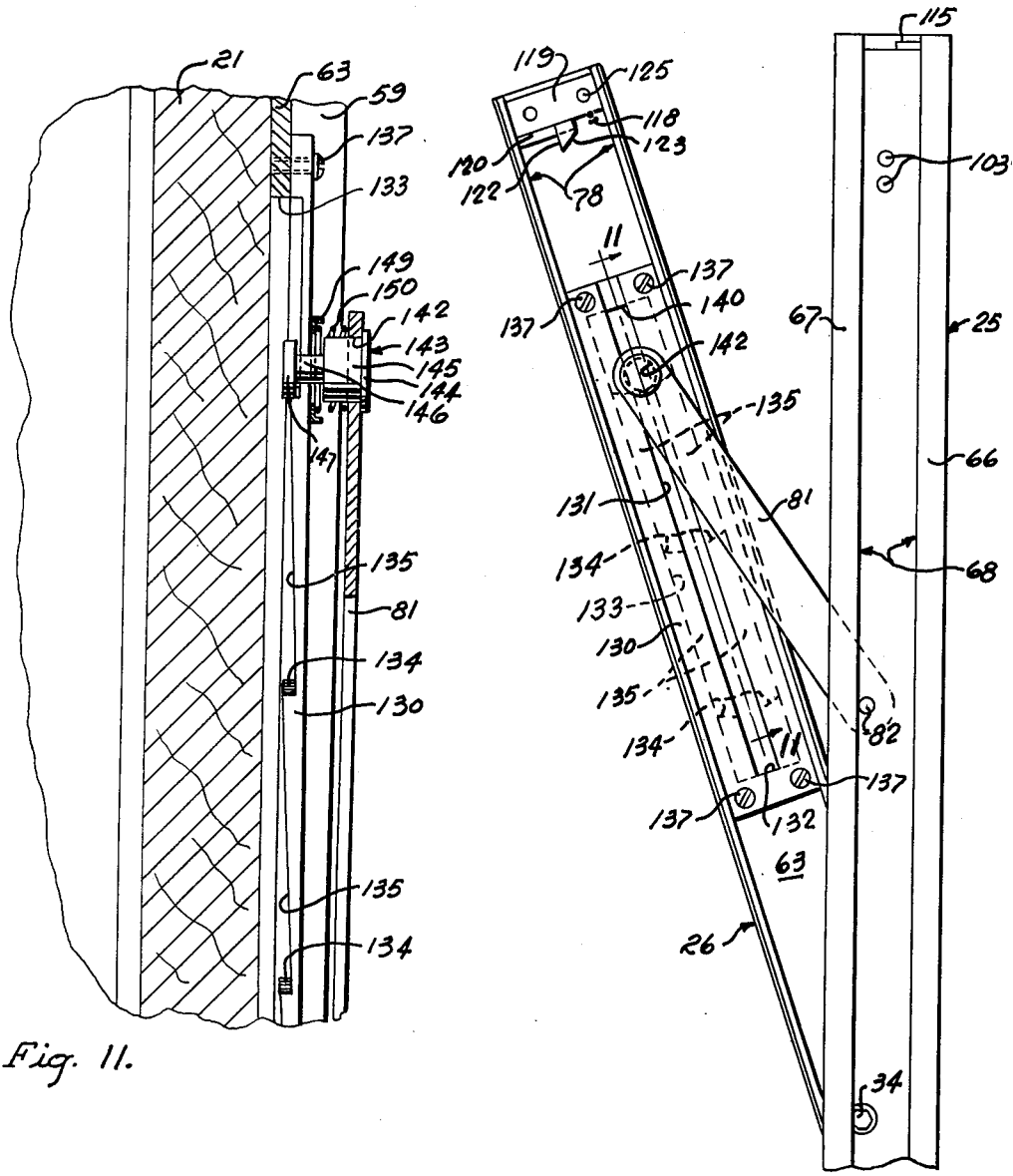

United States Patent Office 2,784,460
Patented Mar. 12, 1957

2,784,460

SLIDABLE AND HINGED WINDOW SASHES

Isaac R. Rinkewich, New York, N. Y.

Application May 12, 1955, Serial No. 507,899

1 Claim. (Cl. 20—49)

This invention relates to slidable and hinged window sashes, and more particularly to the weather stripping, the locking members and the slidable bracket thereof.

It is a principal object of the present invention to provide a slidable and hinged window sash which can be mounted in a frame for a double-hung wooden window so as to provide a metal sash window.

It is another object of the invention to provide a slidable and hinged window sash which will not interfere with storm windows and which can be adjusted to provide ventilation in such a manner as to prevent direct drafts.

It is still another object of the invention to provide a slidable and hinged window sash wherein the outer members are provided with space to accommodate spiral spring balances or counterweight ropes.

It is a still further object of the invention to provide overlapping wedge-like tongue and groove connections between the inner and outer frame members of hinged window sashes so as to provide weather stripping and also locking and guiding action to hold the sash against lateral movement and to render it rattle-proof.

It is a still further object of the invention to provide a simple slide bracket arrangement having a push button device by means of which the bracket can be readily released to permit the closing of the window frame by a single movement and which serves to hold the bracket extended and the sash in any one of a plurality of open positions.

Other objects of the invention are to provide a slidable and hinged window sash assembly having the above objects in mind which is of simple construction, is inexpensive to manufacture, has a minimum number of parts, is easily assembled within the window frame by means of screws and which permits the adjustment of the windows so that the outer surface of the glass can readily be cleaned within the room.

Still other objects of the invention are to provide a slidable and hinged window sash assembly which is durable, compact, efficient in operation and of pleasing appearance, which is formed of extruded parts and is light in weight, and which has readily accessible, latch device for releasing the inner frame members from the outer.

For other objects and a better understanding of the invention, reference may be had to the following detailed description taken in connection with the accompanying drawing, in which:

Fig. 4 is an enlarged end elevational view of one of the slidable and hinged sash assemblies with the inner frame hinged outwardly and retained in position by its bracket;

Fig. 5 is an enlarged fragmentary vertical sectional view taken through the latch device on line 5—5 of Fig. 4;

Fig. 6 is a bottom plan view of a fragment of the sash assembly as viewed on line 6—6 of Fig. 4;

Fig. 7 is an enlarged plan view of the upper end of the outer frame element as viewed on line 7—7 of Fig. 4;

Fig. 8 is a fragmentary plan view of the upper end of the inner or hinged sash member taken on line 8—8 of Fig. 4;

Fig. 9 is an enlarged transverse sectional view taken through the button retaining member of the bracket as viewed generally on line 9—9 of Fig. 4;

Fig. 10 is an end elevational view of one of the sash assemblies with the inner member extending out from the outer member and having a modified guide plate and button retaining means; and Fig. 11 is an enlarged fragmentary vertical sectional view taken through the guide plate as viewed on line 11—11 of Fig. 10.

Figure 2:
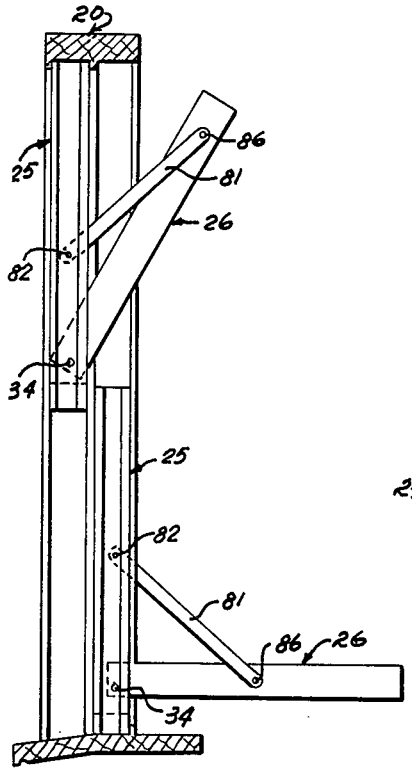
Fig. 2 is a vertical sectional view of the window frame showing the slidable and hinged sash assemblies in elevation.
Figure 1:
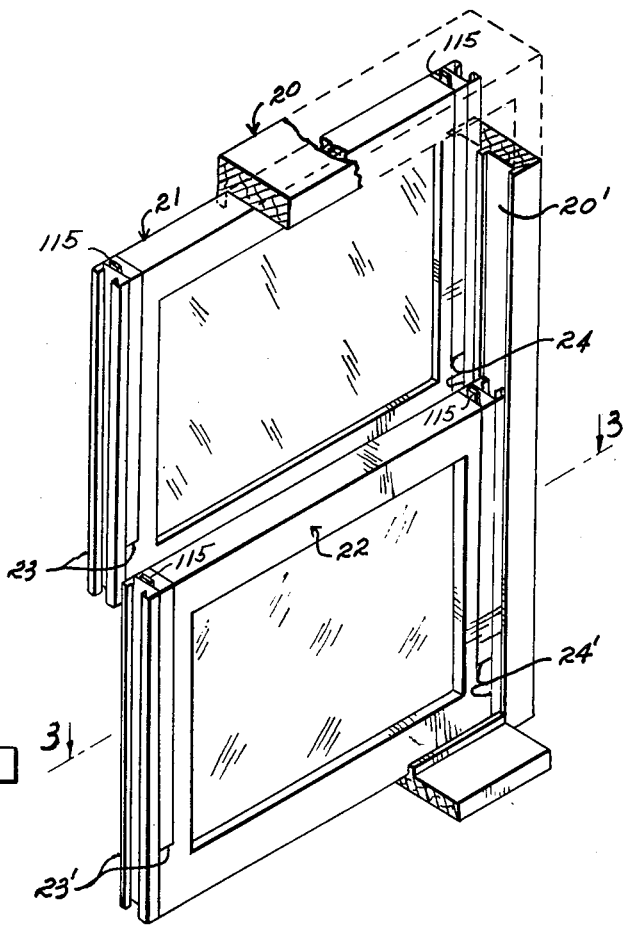
Figure 1 is a perspective view of window elements embodying features of the present invention in a conventional wooden frame, substituted for the original wooden sash, with portions of the wooden frame broken away to show more clearly the sash elements of the invention.
Figure 3:
Fig. 3 is a transverse sectional view taken generally on line 3—3 of Fig. 1.

Referring now to the drawings, 20 is a conventional window casing having the usual guide ways 20' for double-hung upper and lower window sashes 21 and 22, Fig. 1. Hinge units 23, 24, slidable in guide ways 20' are secured to the side edges of sash 21 and hinge units 23', 24' slidable in guide ways 20' are secured to the side edges of sash 22. These hinged members, to be described in detail subsequently, make it possible to raise and lower the sashes in the guide ways and open either sash by swinging it inwardly.

Hinge unit 24, shown in detail in Fig. 4, includes elongated members 25 and 26 of U-shaped section having a web portion 69, L-shaped flanges 66, 67 extending inwardly from the extremities of the U, a longitudinal opening 68 between the L-shaped flanges to permit the normal use of sash balance devices, a flange 45, formed by extending rearwardly one side of the U and having an inwardly facing groove 47 and an inwardly directed tongue 46 at its outer end, and a short flange 50, extending rearwardly from the other side of the U, having an outwardly facing groove 51 and a tongue 52. A spacer block 27 is secured to web 69 of member 25, close to one end and adjacent flange 45, by means of rivets 40.

Elongated generally U-shaped member 26 of hinge 24 has a web portion 63, a short side 59 provided with an outwardly facing groove 61, a tongue 62 and a longer arm 55 having an inwardly facing groove 57 and an inwardly-extending tongue 56 at its end. A spacer block 28 is secured to web 63 of member 26, within the U, by means of rivets 39.

A bolt or hinge pin 34, having a threaded end 33 of reduced diameter to receive nut 34', passing through openings 29 in spacer blocks 27, 28, pivotally connects members 25, 26 to form hinge unit 24. An opening 30 in web portion 69 of member 25 receives the head of the bolt 34, Fig. 6, and an opening 35 in web portion 69 of member 26 receives the nut 34'.

Member 26 of hinge unit 24 is secured to the side edges of sash 21 by means of screws 58, while member 25 slides in sash guide way 20', hinge units 23 and 24 are identical, while hinge units 23' and 24' are similar to hinge units 23 and 24 of the lower window sash 22.

When members 25 and 26 of hinge unit 24 are pivoted together so that they assume a parallel position, tongue 56 of flange 55 of member 26 will fit in groove 51 of flange 50 of member 25 and in a groove 51' in spacer block 27, Figs. 4 and 6, and tongue 46 of flange 45 of member 25 will fit in groove 61 of flange 59 of member closed herein but is to be accorded the full scope of the claims so as to embrace any and all equivalent devices.

Having described our invention, what we claim as new and desire to secure by Letters Patent is:

1. A mechanical action for artificial limb joints comprising a relatively stationary member and a ratchet segment rotatably mounted on the member, a lever rotatably mounted on the member with the rotational axis adjacent to the circumference of the ratchet segment, a locking bar on said lever having opposite curved faces positioned generally perpendicular to the radius from the rotational axis of the lever, said segment having a series of spaced generally radially extending bar receiving notches with faces complementary to the respective faces of the bar when in bar receiving position, said rotational axis of the lever being at a point adjacent a line tangent to an arc about the axis of said segment struck through the centers of the faces of said notch.

2. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite faces positioned generally perpendicular to the radius from the rotational axis of the lever and the faces, said segment being subject to a rotative load and having a series of spaced generally radially extending bar receiving notches with faces complementary to the respective faces of the bar when in bar receiving position, said rotational axis of the lever being within an angular distance of a line tangent to an arc about the axis of said segment struck through the centers of the faces of said notch such that the component of the force resulting from application of a rotative load tending to disengage the bar from the notch is less than the frictional force on the respective contacting faces.

3. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite arcuate faces positioned generally perpendicular to the radius from the rotational axis of the lever and the faces, said segment having a series of spaced generally radially extending bar receiving notches with arcuate faces complementary to the respective faces of the bar when at bar receiving position, said rotational axis of the lever being within an angular distance of five degrees inside of a line tangent to an arc about the axis of said segment struck through the centers of the faces of said notch.

4. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite arcuate faces of radius of curvature determined by the distance between the rotational axis of the lever and the respective face, said segment having a series of spaced generally radially extending bar receiving notches with arcuate faces complementary to the respective faces of the bar, said rotational axis of the lever being at a point within an angular distance of 15 degrees on either side of a line tangent to an arc centered at the axis of said segment and through the centers of the faces of a notch in bar engaging position, the faces of said notches having positions wherein said last faces are in engagement substantially throughout their areas with the respective faces of the bar when in bar engaging position.

5. A mechanical action for artificial limb joints comprising a pair of members wherein one member is adapted for attachment to a natural limb, parallel plates on one of the members, the other of said members comprising a tubular sleeve rotatably mounted on said plates providing thereby an articulating joint for said action, a ratchet segment fixed on said sleeve having a series of spaced generally radially extending notches, a lever pivotally mounted at a center of rotation on said one member, a locking bar fixed transversely on the lever, and an alternator connected between the lever and one of said members adapted to releasably hold said bar out of notch engagement position, said bar having opposite notch contacting faces curved in the same general direction and said notches having opposite curved bar engaging faces complementary to and adapted to engage the respective faces of the bar when in bar engaging position.

6. A mechanical action for artificial limb joints comprising a relatively stationary member adapted for attachment to a natural limb, parallel plates on said member and a tubular sleeve rotatably mounted on said plates providing thereby an articulating joint for said action, a ratchet segment fixed on said sleeve having a series of spaced generally radially extending notches, a lever pivotally mounted at a center of rotation on said member, a locking bar fixed transversely on the lever, a spring on said member normally urging said bar toward a notch engagement position, and an alternator connected between said member and the lever adapted to releasably hold said bar out of notch engagement position, said bar having opposite notch contacting faces of arcuate form and of radius determined by the distance between the respective face and said center of rotation of the lever, said notches having opposite bar engaging faces of arcuate form complementary to and adapted to engage the respective faces of the bar when in bar engaging position.

7. A ratchet resistant mechanical action for artificial limb joints comprising a base, a ratchet segment rotatably mounted on the base and a locking bar having a pivotal mounting on said base, said locking bar having opposite segment-engaging faces curved in the same general direction about the axis of said pivotal mounting, said segment having a series of peripheral bar receiving notches with opposite faces respectively complementary to the faces on said bar.

References Cited in the file of this patent
UNITED STATES PATENTS
2,637,042    Threewit               May 5, 1953

FOREIGN PATENTS
303,664    Germany              Feb. 11, 1918 window sash, a fixed catch on the upper end of the inner hinged member adapted to ride over and engage with the latch device, spacer blocks respectively secured to the web portions of the respective web members of the hinged units near the lower ends thereof and lying between their short and long flanges a hinged pin extending through the web portions and the spacer blocks, the web portion of the inner member having an elongated opening, a guide plate secured to the said web portion over the opening thereof and having an elongated opening with catch flanges thereon, a guide arm pivotally connected at one end to the outer hinge member, a spring-loaded button catch device biasingly connected to the other end of the guide arm and projected into the elongated openings of the guide plate and the web portion, said catch device having a shoulder adapted to engage the catch formations of the guide plate and a reduced diameter portion adapted to slide through the elongated slot of the guide plate when the catch device is released from the catch formations.

References Cited in the file of this patent

UNITED STATES PATENTS

| | | |
|---|---|---|
| 645,357 | Haberle | Mar. 13, 1900 |
| 1,851,293 | Ross | Mar. 29, 1932 |
| 1,922,360 | Fast | Aug. 15, 1933 |
| 2,042,771 | Dennis | June 2, 1936 |
| 2,126,177 | Dennis | Aug. 9, 1938 |
| 2,169,903 | Ruehl | Aug. 15, 1939 |